United States Patent
Chen et al.

(10) Patent No.: US 10,312,981 B2
(45) Date of Patent: Jun. 4, 2019

(54) USER EQUIPMENT AND METHODS FOR CODEBOOK SUBSAMPLING FOR ENHANCED 4TX CODEBOOKS

(71) Applicant: Intel IP Corporation, Santa Clara, CA (US)

(72) Inventors: Xiaogang Chen, Hillsboro, OR (US); Yuan Zhu, Beijing (CN); Qinghua Li, San Ramon, CA (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/413,182

(22) Filed: Jan. 23, 2017

(65) Prior Publication Data
US 2017/0272136 A1 Sep. 21, 2017

Related U.S. Application Data

(63) Continuation of application No. 14/739,815, filed on Jun. 15, 2015, now Pat. No. 9,553,643, which is a
(Continued)

(51) Int. Cl.
*H04B 7/04* (2017.01)
*H04B 7/0456* (2017.01)
(Continued)

(52) U.S. Cl.
CPC ......... *H04B 7/0456* (2013.01); *H04B 7/0452* (2013.01); *H04B 7/0486* (2013.01);
(Continued)

(58) Field of Classification Search
CPC .. H04B 7/0639; H04B 7/0626; H04B 7/0486; H04B 7/0632; H04B 7/0456; H04B 7/0621
See application file for complete search history.

(56) References Cited

U.S. PATENT DOCUMENTS 8,639,198 B2   1/2014   Liu et al.
9,071,297 B2   6/2015   Chen et al.
(Continued)

FOREIGN PATENT DOCUMENTS

CN   105144647 A   12/2015
CN   105165042 A   12/2015
(Continued)

OTHER PUBLICATIONS

U.S. Appl. No. 14/108,648, filed Dec. 17, 2013, U.S. Pat. No. 9,071,297, User Equipment and Methods for Codebook Subsampling for Enhanced 4TX Codebooks.
(Continued)

*Primary Examiner* — Jean B Corrielus
(74) *Attorney, Agent, or Firm* — Schwegman Lundberg & Woessner, P.A.

(57) ABSTRACT

Embodiments of user equipment (UE) and methods for codebook subsampling for enhanced 4TX codebooks in 3GPP LTE wireless networks are generally described herein. In some embodiments, a physical uplink control channel (PUCCH) is configured for transmission of channel state information (CSI) feedback including a rank indicator (RI) and a precoding matrix (W1). The rank indicator (RI) and a precoding matrix (W1) are jointly encoded and codebook subsampling is performed for the enhanced 4Tx codebook for at least one of: PUCCH report type 5 (RI/1st PMI) in PUCCH 1-1 submode 1; PUCCH report type 2c (CQI/1st PMI/2nd PMI) in PUCCH 1-1 submode 2; and PUCCH report type 1a (subband CQI/2nd PMI) in PUCCH 2-1.

15 Claims, 1 Drawing Sheet

Related U.S. Application Data continuation of application No. 14/108,648, filed on Dec. 17, 2013, now Pat. No. 9,071,297.

(60) Provisional application No. 61/829,968, filed on May 31, 2013.

(51) Int. Cl.
| | | |
|---|---|---|
| *H04B 7/06* | (2006.01) | |
| *H04W 12/02* | (2009.01) | |
| *H04W 48/16* | (2009.01) | |
| *H04W 28/02* | (2009.01) | |
| *H04B 7/0452* | (2017.01) | |
| *H04L 27/20* | (2006.01) | |
| *H04W 92/24* | (2009.01) | |
| *H04W 4/70* | (2018.01) | |
| *H04W 76/14* | (2018.01) | |

(52) U.S. Cl.
CPC .......... *H04B 7/063* (2013.01); *H04B 7/0617* (2013.01); *H04B 7/0626* (2013.01); *H04B 7/0632* (2013.01); *H04B 7/0639* (2013.01); *H04L 27/20* (2013.01); *H04W 4/70* (2018.02); *H04W 12/02* (2013.01); *H04W 28/0289* (2013.01); *H04W 48/16* (2013.01); *H04W 92/24* (2013.01); *H04W 76/14* (2018.02)

(56) References Cited

U.S. PATENT DOCUMENTS

| | | | |
|---|---|---|---|
| 9,553,643 | B2 | 1/2017 | Chen et al. |
| 9,559,761 | B2 | 1/2017 | Luft et al. |
| 2010/0118817 | A1 | 5/2010 | Damnjanovic et al. |
| 2010/0189071 | A1 | 7/2010 | Kitazoe |
| 2010/0268775 | A1 | 10/2010 | Doppler et al. |
| 2011/0098043 | A1 | 4/2011 | Yu et al. |
| 2012/0076024 | A1* | 3/2012 | Ko .................. H04B 7/0486 370/252 |
| 2012/0076028 | A1 | 3/2012 | Ko et al. |
| 2012/0079019 | A1 | 3/2012 | Miettinen et al. |
| 2012/0079109 | A1 | 3/2012 | Klein et al. |
| 2012/0087425 | A1 | 4/2012 | Gomadam et al. |
| 2012/0093098 | A1 | 4/2012 | Charbit et al. |
| 2012/0218948 | A1 | 8/2012 | Onggosanusi et al. |
| 2012/0219042 | A1 | 8/2012 | Onggosanusi et al. |
| 2012/0220286 | A1 | 8/2012 | Chen et al. |
| 2013/0040677 | A1 | 2/2013 | Lee et al. |
| 2013/0064276 | A1* | 3/2013 | Kim .................. H04B 7/0486 375/219 |
| 2013/0077704 | A1 | 3/2013 | Ding et al. |
| 2014/0086352 | A1 | 3/2014 | Ko et al. |
| 2014/0092885 | A1 | 4/2014 | Venkatachalam et al. |
| 2014/0169300 | A1 | 6/2014 | Kim et al. |
| 2014/0219219 | A1 | 8/2014 | Onggosanusi et al. |
| 2014/0254701 | A1 | 9/2014 | Geirhofer et al. |
| 2014/0286284 | A1 | 9/2014 | Lim et al. |
| 2014/0286452 | A1 | 9/2014 | Gomadam et al. |
| 2014/0315562 | A1 | 10/2014 | Lim et al. |
| 2014/0328422 | A1* | 11/2014 | Chen .................. H04B 7/0486 375/267 |
| 2014/0355705 | A1 | 12/2014 | Chen et al. |
| 2014/0357228 | A1 | 12/2014 | Luft et al. |
| 2016/0006493 | A1 | 1/2016 | Chen et al. |

FOREIGN PATENT DOCUMENTS

| | | |
|---|---|---|
| CN | 105144647 | 11/2018 |
| EP | 2965445 A1 | 1/2016 |
| EP | 3005636 B1 | 8/2018 |
| KR | 1020120031895 A | 4/2012 |
| TW | I556658 B | 11/2016 |
| WO | WO-2007044597 A2 | 4/2007 |
| WO | WO-2013062310 A1 | 5/2013 |
| WO | WO-2013062351 A1 | 5/2013 |
| WO | WO-2014193718 A1 | 12/2014 |
| WO | WO-2014193749 A1 | 12/2014 |

OTHER PUBLICATIONS

U.S. Appl. No. 14/739,815, filed Jun. 15, 2015, U.S. Pat. No. 9,553,643, User Equipment and Methods for Codebook Subsampling for Enhanced 4TX Codebooks.

U.S. Appl. No. 14/141,843, filed Dec. 27, 2013, U.S. Pat. No. 9,559,761, Proximity-Based Services Discovery Privacy.

U.S. Appl. No. 15/373,950, filed Dec. 9, 2016, Proximity-Based Services Discovery Privacy.

"3rd Generation Partnership Project; Technical Specification Group Radio Access Network; Evolved Universal Terrestrial Radio Access (E-UTRA) Medium Access Control (MAC) protocol specification (Release 8)", 3GPP TS 36.321 V8.1.0, (Mar. 2008), 30 pgs.

"3rd Generation Partnership Project; Technical Specification Group Radio Access Network; Evolved Universal Terrestrial Radio Access (E-UTRA); Medium Access Control (MAC) protocol specification (Release 10)", 3GPP TS 36.321 V10.0.0, (Dec. 2010), 53 pgs.

"3rd Generation Partnership Project; Technical Specification Group Services and System Aspects; Study on architecture enhancements to support Proximity Services (ProSe) (Release 12)", 3GPP Draft; 23703-030-PROSE-RM, 3rd Generation Partnership Project (3GPP), Mobile Competence Centre ; 650, Route Lucioles ; F-06921 Sophia-Antipolis Cedex ; France, XP050707957, [Online] retrieved from the internet: <http://www.3gpp.org/ftp/tsg_sa/WG2_Arch/Latest_SA2_Specs/Latest_draft_S2_Specs/>, (Apr. 19, 2013).

"U.S. Appl. No. 14/108,648, Non Final Office Action dated Oct. 21, 2014", 8 pgs.

"U.S. Appl. No. 14/108,648, Notice of Allowance dated Feb. 25, 2015", 16 pgs.

"U.S. Appl. No. 14/108,648, Response filed Jan. 21, 2015 to Non Final Office Action dated Oct. 21, 2014", 13 pgs.

"U.S. Appl. No. 14/141,843, Final Office Action dated May 12, 2016", 21 pgs.

"U.S. Appl. No. 14/141,843, Non Final Office Action dated Mar. 3, 2015", 17 pgs.

"U.S. Appl. No. 14/141,843, Non Final Office Action dated Oct. 8, 2015", 18 pgs.

"U.S. Appl. No. 14/141,843, Notice of Allowance dated Sep. 16, 2016", 14 pgs.

"U.S. Appl. No. 14/141,843, Response filed Feb. 3, 2015 to Non Final Office Action dated Oct. 8, 2015", 7 pgs.

"U.S. Appl. No. 14/141,843, Response filed Jul. 1, 2015 to Non Final Office Action dated Mar. 3, 2015", 7 pgs.

"U.S. Appl. No. 14/739,815, Examiner Interview Summary dated Aug. 24, 2016", 2 pgs.

"U.S. Appl. No. 14/739,815, Non Final Office Action dated Mar. 3, 2016", 10 pgs.

"U.S. Appl. No. 14/739,815, Notice of Allowance dated Sep. 15, 2016", 16 pgs.

"U.S. Appl. No. 14/739,815, Preliminary Amendment filed Sep. 30, 2015", 8 pgs.

"U.S. Appl. No. 14/739,815, Response filed Jul. 5, 2016 to Non Final Office Action dated Mar. 3, 2016", 12 pgs.

"U.S. Appl. No. 25/141,843, Response filed Aug. 12, 2016 to Final Office Action dated May 12, 2016", 8 pgs.

"Application Serial No. PCT/US2014/039072, International Preliminary Report on Patentability dated Dec. 10, 2015", 7 pgs.

"Application Serial No. PCT/US2014/039313, International Preliminary Report on Patentability dated Dec. 10, 2015", 7 pgs.

"European Application Serial No. 14804124.7, Extended European Search Report dated Dec. 22, 2016", 11 pgs.

"European Application Serial No. 14804412.6, Extended European Search Report dated Dec. 20, 2016", 15 pgs.

"International Application Serial No. PCT/US2014/039072, International Search Report dated Sep. 25, 2014", 4 pgs.

"International Application Serial No. PCT/US2014/039072, Written Opinion dated Sep. 25, 2014", 5 pgs.

(56) References Cited

OTHER PUBLICATIONS

"International Application Serial No. PCT/US2014/039313, International Search Report dated Sep. 26, 2014", 4 pgs.
"International Application Serial No. PCT/US2014/039313, Written Opinion dated Sep. 26, 2014", 5 pgs.
"Required Information for D2D discovery", Samsung, 3GPP Draft; RI-131995 Required Information for D2D Discovery, 3rd Generation Partnership Project (3GPP), Mobile Competence Centre ; 650, Route Des Lucioles ; F-06921 Sophia-Antipolis Cedex; France, vol. RAN WG1, No. Fukuoka, Japan, [Online] retrieved from the internet: <http://www.3gpp.org/ftp/tsg_ran/WGl_RL1/TSGRI_73/Docs/>, (May 11, 2013).
"Taiwanese Application Serial No. 103118240, Office Action dated Mar. 11, 2016", W/ English Translation, 17 pgs.
"Taiwanese Application Serial No. 103118240, Office Action dated Jun. 16, 2015", w/ English Translation, 15 pgs.
"Taiwanese Application Serial No. 103118240, Response filed Jun. 14, 2016 to Office Action dated Mar. 11, 2016", (English Translation of Claims), 11 pgs.
"Way Forward on further details of feedback modes for Rel-12 4Tx rank3&4", 3GPP Draft; R1-132734 WF on REL-12 CSI Feedback Modes for 4T Rank34, 3rd Generation Partnership Project (3GPP), Mobile Competence Centre; 650, Route Des Lucioles; F-06921 Sophia-Antipolis Cedex; F; vol. RAN WG1, No. Fukuoka, Japan, Retrieved from the Internet: <URL:http://www.3gpp org/ftp/tsg_ran/WG1_RL1/TSGR1_73/Docs/> [retrieved on May 22, 2013], (May 22, 2013).
Bell, Alcatel-Lucent Shanghai, et al., "Details of CSI feedback modes for DL MIMO Enhancement", 3GPP Draft; R1-132049 Details of CSI Feedback Modes for DL MIMO Enhancement Final, 3rd Generation Partnership Project (3GPP), Mobile Competence Centre; 650, Route Des Lucioles; F-06921 Sophia-Antipo, vol. RAN WG1, No. Fukuoka, Japan, Retrieved from the Internet: <URL:http://www.3gpp.org/ftp/tsgran/WG1RL1/TSGR173/Docs/> [retrieved on May 11, 2013], (May 11, 2013).
MCC Support, "Draft Report of 3GPP TSG RAN WG1 #73 v0.1.0 (Fukuoka, Japan, May 20-24, 2013)", 3GPP Draft; Draft Minutes Report RAN1#73 V010, 3rd Generation Patnership Projet (3GPP), Mobile Competence Centre; 650, Route Des Lucioles; F-06921 Sophia-Antipolis Cedex; France vol. RAN WG1, No. Barcelona, Spain, Retrieved from the Internet: <URL:http://www.3gpp.org/ftp/tsg_ran/WG1_RL1/TSGR1_73/Report/> [retrieved on May 29, 2013], (May 29, 2013), 104 pgs.

Qualcomm Incorporated, "Design and configuration of the enhanced 4TX codebook for ranks 1 and 2", 3GPP Draft; R1-132482 Design and Configuration of Enhanced 4TX Codebook for Rank 1 and 2, 3rd Generation Partnership Project (3GPP), Mobile Competence Centre; 650, Route Des Lucioles ; F-06921 Sophia, vol. RAN WG1, No. Fukuoka, Japan, Retrieved from the Internet: <UR:http://www.3gpp.org/ftp/tsgran/WG1RL1/TSGR173/Docs/> [retrieved on May 11, 2013], (May 11, 2013), 6 pgs.
Qualcomm Incorporated, "Remaining issues of eMIMO CSI feedback", 3GPP Draft; R1-132485 Remaining Issues of EMIMO CSI Feedback, 3rd Generation Partnership Project (3GPP), Mobile Competence Centre; 650, Route Des Lucioles; F-06921 Sophia-Antipolis Cedex; France vol. RAN WG1, No. Fukuoka, Japan, Retrieved from the Internet: <URL:http://www.3gpp.org/ftp/tsg_ran/WG1_RL1/TSGR1_73/Docs/> [retrieved on May 11, 2013], (May 11, 2013).
Samsung, "Remaining Details on PUCCH Reporting Mode", 3GPP Draft; R1-105778 Remaining Details on PUCCH Reporting Mode REV1, 3rd Generation Partnership Project (3GPP), Mobile Competence Centre; 650, Route Des Lucioles; F-06921 Sophia-Antipolis Cedex; France, vol. RAN WG1, No. Xi 'an, China, (Oct. 14, 2010).
"European Application Serial No. 14804412.6, Response Filed Jul. 6, 2017 to Extended European Search Report dated Dec. 20, 2016", 18 pgs.
"European Application Serial No. 17182135.8, Extended European Search Report dated Nov. 20, 2017", 17 pgs.
"Remaining Issues of eMIMO CSI feedback", 3GPP TSG RAN WG1 #73 R1-132485, (May 11, 2013), 3 pgs.
"Chinese Application Serial No. 201480024584.4, Response filed May 31, 2018 to Office Action dated Jan. 19, 2018", W/ English Claims, 8 pgs.
"European Application Serial No. 17182135.8, Response filed Jul. 3, 2018 to Extended European Search Report dated Nov. 20, 2017", 24 pgs.
"Uropean Application Serial No. 14804124.7, Response filed Sep. 26, 2018 to Communication Pursuant to Article 94(3) EPC dated Mar. 16, 2018", 9 pgs.
"European Application Serial No. 14804124.7, Communication Pursuant to Article 94(3) EPC dated Jan. 15, 2019", 4 pgs.
"European Application Serial No. 17182135.8, Communication Pursuant to Article 94(3) EPC dated Mar. 11, 2019", 9 pgs.

* cited by examiner

USER EQUIPMENT AND METHODS FOR CODEBOOK SUBSAMPLING FOR ENHANCED 4TX CODEBOOKS This application is a continuation of U.S. patent application Ser. No. 14/739,815, filed Jun. 15, 2015, now issued as U.S. Pat. No. 9,553,643, which is a continuation of U.S. patent application Ser. No. 14/108,648, filed Dec. 17, 2013, now issued as U.S. Pat. No. 9,071,297, which claims priority under 35 U.S.C. 119(e) to U.S. Provisional Patent Application Ser. No. 61/829,968, filed May 31, 2013, each of which is incorporated herein by reference in their entirety.

TECHNICAL FIELD

Embodiments pertain to wireless communications. Some embodiments relate to multiple-input multiple output (MIMO) codebook subsampling in cellular networks, such as E-UTRAN networks operating in accordance with one of the 3GPP standards for the Long Term Evolution (LTE) (3GPP LTE).

BACKGROUND

Closed-loop MIMO systems typically transmit channel state information from a receiver to a transmitter over a feedback path. The channel state information may be used to employ beamforming to compensate for the current channel conditions increasing signal-to-noise (SNR) levels at the receiver. In some of these conventional systems, a beamforming matrix may be generated at the receiver based on the channel conditions. The beamforming matrix may then be provided to the transmitter as feedback. This feedback consumes bandwidth that might otherwise be available for data traffic. To reduce the overhead associated with this feedback, codewords of a known codebook may be provided instead of an actual beamforming matrix. The codewords may indicate which beamforming matrix is to be used by the transmitter.

In MIMO systems, the size of the codebooks may increase significantly with number of transmit antennas $N_t$ and the number of transmitted data streams $N_s$. In some conventional systems, the size of the codebook may be based on the number of transmit antennas and the number of data streams. This results in a significant increase in feedback.

Thus, there are general needs for MIMO systems and methods for beamforming with reduced feedback. There are also general needs for MIMO systems and methods that make use of smaller codebooks. There are also general needs for MIMO systems and methods that provide improved performance without an increase in feedback.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
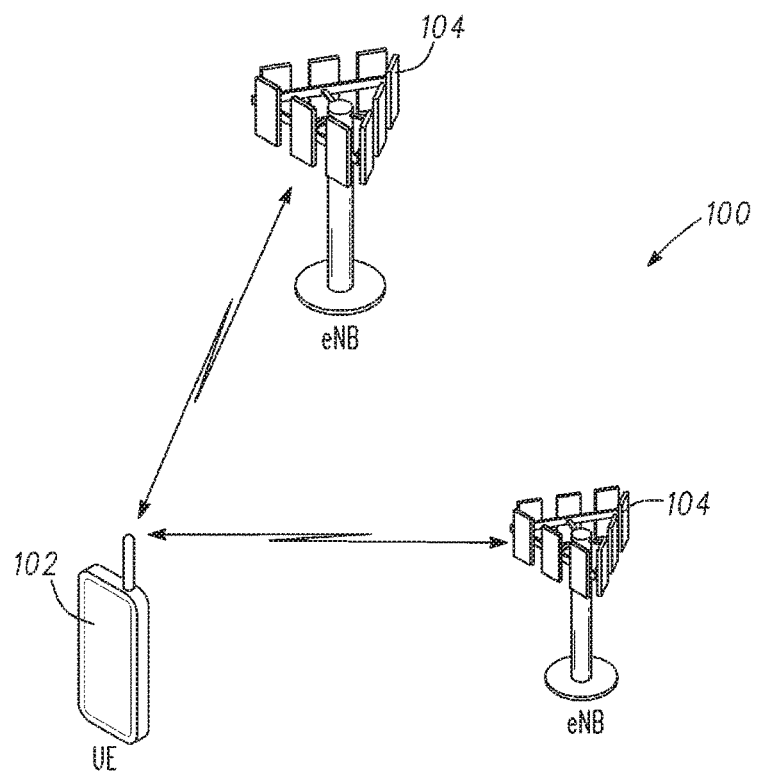
FIG. 1 illustrates a wireless network in accordance with some embodiments.

FIG. 1 illustrates a wireless network in accordance with some embodiments. Wireless network may be configured to operate in accordance with one of the 3GPP standards for the Long Term Evolution (LTE) (3GPP LTE). In these embodiments, wireless network 100 may include one or more enhanced node Bs (eNBs) 104 arranged for communicating with user equipment (UE), such as UE 102. UE 102 may provide feedback 103 to an eNB 104 for performing MIMO beamforming, among other things, as described in more detail below.

In accordance with some embodiments, the UE 102 may be arranged for codebook subsampling for enhanced 4Tx codebooks in a 3GPP LIE network. In these embodiments, the UE 102 may configure a physical uplink control channel (PUCCH) for transmission of channel state information (CSI) feedback including a rank indicator (RI) and a precoding matrix (W1), may jointly encode a rank indicator (RI) and a precoding matrix (W1), and may perform codebook subsampling for the enhanced 4Tx codebook for: PUCCH report type 5 (RI/1st in PUCCH 1-1 submode 1; PUCCH report type 2c (CQI/1st PMI/2nd PMI) in PUCCH 1-1 submode 2; and PUCCH report type 1a (subband CQI/2nd PMI) in PUCCH 2-1. These embodiments are described in more detail below.

In some embodiments, for the PUCCH report type 5 (RI/1st PMI) in PUCCH 1-1 submode 1, when a maximum of four layers of data transmission (i.e., RI=1, 2, 3, or 4) is supported by the UE 102, the UE 102 may jointly encode the RI and the W1 by employing codebook subsampling prior to configuring the CSI transmission (e.g., see table 2-1) at least for a rank indicator of two (RI=2).

In some embodiments, precoding matrix indices of 2, 4, 6, 8, 10, 12 and 14 are used for the codebook subsampling for RI=2 when a maximum of four layers of data transmission is supported (e.g., see table 2-1) to limit the PUCCH payload size for RI feedback to 5-bits.

In some embodiments, precoding matrix indices of 0-7 are used for the codebook subsampling for RI=2 when a maximum of four layers of data transmission is supported to limit the PUCCH payload size for RI feedback to 5-bits, (e.g., see table 2-2).

In some embodiments, precoding matrix indices of 0-6 and 8-14 are used for the codebook subsampling for RI=2 when a maximum of four layers of data transmission is supported to limit the PUCCH payload size for RI feedback to 5-bits. (e.g., see table 3-1).

In some embodiments, precoding matrix indices of 0-13 are used for the codebook subsampling for RI=2 when a maximum of four layers of data transmission is supported (e.g., see table 3-1) to limit the PUCCH payload size for RI feedback to 5-bits.

In some embodiments, when a maximum of two layers of data transmission (i.e., RI=1 or 2) is supported, the RI and W1 are jointly encoded. In these embodiments, the UE 102 may refrain from performing codebook sampling (see table 1).

In some embodiments, the UE 102 may configure PUCCH payload to be 11-bits for the CSI feedback when the CSI feedback includes a channel-quality indicator (CQI) and a precoding matrix indicator (PMI). The UE 102 may configure the PUCCH payload to be 5-bits for the CSI feedback when the CSI feedback includes the RI. In these embodiments, as long as the RI is included (even without PMI), the payload should be less or equal to 5 bits.

In some embodiments, for PUCCH report type 2c (CQI/1st PMI/2nd PMI) in PUCCH 1-1 submode 2, the method comprises performing codebook subsampling for RI-1 or RI-2 in accordance with either table 4-1 or table 4-2.

In some embodiments, for PUCCH report type 1a (subband CQI/2nd PMI) in PUCCH 2-1, the method comprises performing codebook subsampling for RI=1, RI=2, RI=3 or RI=4 in accordance with table 5, table 6 or table 7.

In some embodiments, a dual codebook structure may be used for enhanced 4Tx codebook. Two solutions are proposed for down selection as follows:

Solution 2a:

$$W_1 = \begin{bmatrix} X_n & 0 \\ 0 & X_n \end{bmatrix} \text{ where } n = 0, 1, \ldots, 15$$

$$X_n = \begin{bmatrix} 1 & 1 & 1 & 1 \\ q_1^n & q_1^{n+8} & q_1^{n+16} & q_1^{n+24} \end{bmatrix} \text{ where } q_1 = e^{j2\pi/32}$$

For rank 1, $$W_{2,n} \in \left\{ \frac{1}{\sqrt{2}} \begin{bmatrix} Y \\ \alpha(i)Y \end{bmatrix}, \frac{1}{\sqrt{2}} \begin{bmatrix} Y \\ j\alpha(i)Y \end{bmatrix}, \frac{1}{\sqrt{2}} \begin{bmatrix} Y \\ -\alpha(i)Y \end{bmatrix}, \frac{1}{\sqrt{2}} \begin{bmatrix} Y \\ -j\alpha(i)Y \end{bmatrix} \right\}$$

and $Y \in \{e_1, e_2, e_3, e_4\}$ and $\alpha(i) = q_1^{2(i-1)}$;

For rank 2, $W_{2,n} \in \left\{ \frac{1}{2} \begin{bmatrix} Y_1 & Y_2 \\ Y_1 & -Y_2 \end{bmatrix}, \frac{1}{2} \begin{bmatrix} Y_1 & Y_2 \\ jY_1 & -jY_2 \end{bmatrix} \right\}$ and $(Y_1, Y_2) = (e_l, e_k) \in \{(e_1, e_1), (e_2, e_2),$ $(e_3, e_3), (e_4, e_4), (e_1, e_2), (e_2, e_3), (e_1, e_4), (e_2, e_4)\}$;

Solution 2b:

$$W_1 = \begin{bmatrix} X_n & 0 \\ 0 & X_n \end{bmatrix} \text{ where } n = 0, 1, \ldots, 15$$

$$X_n = \begin{bmatrix} 1 & 1 & 1 & 1 \\ q_1^n & q_1^{n+8} & q_1^{n+16} & q_1^{n+24} \end{bmatrix} \text{ where } q_1 = e^{j2\pi/32}$$

For rank 1, $$W_{2,n} \in \left\{ \frac{1}{\sqrt{2}} \begin{bmatrix} Y \\ \alpha(i)Y \end{bmatrix}, \frac{1}{\sqrt{2}} \begin{bmatrix} Y \\ j\alpha(i)Y \end{bmatrix}, \frac{1}{\sqrt{2}} \begin{bmatrix} Y \\ -\alpha(i)Y \end{bmatrix}, \frac{1}{\sqrt{2}} \begin{bmatrix} Y \\ -j\alpha(i)Y \end{bmatrix} \right\}$$

and $Y \in \{e_1, e_2, e_3, e_4\}$ and $\alpha(i) = q_1^{2(i-1)}$;

For rank 2, $W_{2,n} \in$ $$\left\{ \frac{1}{2} \begin{bmatrix} Y_1 & Y_2 \\ Y_1 & -Y_2 \end{bmatrix}, \frac{1}{2} \begin{bmatrix} Y_1 & Y_2 \\ j_1 & -Y_2 \end{bmatrix}, \frac{1}{2} \begin{bmatrix} Y_1 & Y_2 \\ -Y_1 & Y_2 \end{bmatrix}, \frac{1}{2} \begin{bmatrix} Y_1 & Y_2 \\ -Y_1 & -Y_2 \end{bmatrix} \right\} (Y_1, Y_2) \in$$

$\{(e_2, e_4)\}$ and $$W_{2,n} \in \left\{ \frac{1}{2} \begin{bmatrix} Y_1 & Y_2 \\ Y_1 & -Y_2 \end{bmatrix}, \frac{1}{2} \begin{bmatrix} Y_1 & Y_2 \\ jY_1 & -jY_2 \end{bmatrix} \right\} (Y_1, Y_2) \in$$

$\{(e_1, e_1), (e_2, e_2), (e_3, e_3), (e_4, e_4)\}$ and $$W_{2,n} \in \left\{ \frac{1}{2} \begin{bmatrix} Y_1 & Y_2 \\ Y_2 & -Y_1 \end{bmatrix} \right\} (Y_1, Y_2) \in \{(e_1, e_3), (e_2, e_4), (e_3, e_1), (e_4, e_2)\}$$

Similar with 8Tx dual codebook, codebook subsampling should be applied for periodic CSI feedback to meet the PUCCH feedback channel capacity. This disclosure proposes the codebook subsampling schemes for enhanced 4Tx codebook in periodic CSI feedback.

In accordance with embodiments, in order to achieve reliable CSI feedback, the PUCCH payload should be no more than:

11 bits if current CSI feedback instance includes CQI/PMI feedback;

5 bits if current CSI feedback instance includes RI feedback.

Then codebook subsampling may be applied for: PUCCH report type 5 (RI/$1^{st}$ PMI) in PUCCH 1-1 submode 1; PUCCH report type 2c (CQI/$2^{st}$ PMI/$2^{nd}$ PMI) in PUCCH 1-1 submode 2; PUCCH report type 1a (subband CQI/$2^{nd}$ PMI) in PUCCH 2-1; for the enhanced 4Tx codebook.

Codebook subsample for PUCCH 1-1 submode 1:

Since the enhanced 4Tx codebook reuse Rel. 8 codebook for rank 3~4 and W1 is an identity matrix, subsampling of W1 ($1^{st}$ PMI) only needs to take rank1~2 into consideration. In order to limit the payload size of PUCCH report type 5 within 5 bits, the following scheme could be used:

Alt 1) If the UE supports maximum 2 layer transmission, no subsampling is needed. RI and W1 could be jointly encoded following table 1.

TABLE 1

| RI | W1 index after sub-sampling | No. W1 hypotheses |
|---|---|---|
| 1 | 0~15 | 16 |
| 2 | 0~15 | 16 |
| Total no. W1 + RI hypotheses across ranks 1-2 (max. layers = 2) | | 32 (5 bits) |

If the UE supported maximum layer is 4, RI and W1 could jointly encoded following table 2-1 or table 2-2.

The principle for rank 1 is to keep as many W1 as possible. For rank 2, table 2-1 is optimized to equally subsample W1 of rank 2 for solution 2a; table 2-2 is optimized for solution 2b to avoid duplicated codewords.

Note that table 2-1 and table 2-2 could also be used as a unified solution even if UE supports maximum 2 layer transmission.

TABLE 2-1

| RI | W1 index after sub-sampling | No. W1 hypotheses |
|---|---|---|
| 1 | 0~15 | 16 |
| 2 | 0, 2, 4, 6, 8, 10, 12, 14 | 8 |
| 3 | 0 | 1 |
| 4 | 0 | 1 |
| Total no. W1 + RI hypotheses across ranks 1-4 (max. layers = 4) | | 26 (5 bits) |

TABLE 2-2

| RI | W1 index after sub-sampling | No. W1 hypotheses |
|---|---|---|
| 1 | 0~15 | 16 |
| 2 | 0~7 | 8 |
| 3 | 0 | 1 |
| 4 | 0 | 1 |
| Total no. W1 + RI hypotheses across ranks 1-4 (max. layers = 4) | | 26 (5 bits) |

Alt 2) Another alternative is the same as alt 1) except table 2-1 and table 2-2 are changed to table 3-1 and table 3-2 respectively to effectively use the 32 W1 hypotheses that could be indicated with 5 bits.

TABLE 3-1

| RI | W1 index after sub-sampling | No. W1 hypotheses |
|---|---|---|
| 1 | 0~15 | 16 |
| 2 | 0~6, 8~14 | 14 |
| 3 | 0 | 1 |
| 4 | 0 | 1 |
| Total no. W1 + RI hypotheses across ranks 1-4 (max. layers = 4) | | 32 (5 bits) |

TABLE 3-2

| RI | W1 index after sub-sampling | No. W1 hypotheses |
|---|---|---|
| 1 | 0~15 | 16 |
| 2 | 0~13 | 14 |
| 3 | 0 | 1 |
| 4 | 0 | 1 |
| Total no. W1 + RI hypotheses across ranks 1-4 (max. layers = 4) | | 32 (5 bits) |

Codebook subsample for PUCCH 1-1 submode 2:

Since the enhanced 4Tx codebook of rank 3~4 reuse Rel. 8 codebook and W1 is an identity matrix, W2 could be indicated by 4 bits for rank 3~4. Then no subsampling is needed for PUCCH 1-1 submode 2 in rank 3~4.

For rank 1~2, the table 4-1 or table 4-2 could be used for codebook subsampling. The principle of subsampling for rank 1 is to equally distribute the DFT precoding vector within the AoD (angle of departure) range of eNB. The principle of subsampling for rank 2 is to keep all of the 2 possible co-phasing while covering eNB's AoD range with W1 as much as possible.

The definition of $e_i$ is the same, i.e. $e_i$ is a 4×1 vector with the ith component equals to 1 and the other components are zero. e.g. e1=[1 0 0 0]';

TABLE 4-1

| RI | W1 + W2 index after sub-sampling | No. W1 + W2 hypotheses |
|---|---|---|
| 1 | W1: 0, 2, 4, 6, 8, 10, 12, 14 or 1, 3, 5, 7, 9, 11, 13,15<br>W2: 0~15 | 128 (7 bits) |
| 2 | W1: 0, 2, 4, 6, 8, 10, 12, 14 or 1, 3, 5, 7, 9, 11, 13, 15<br>W2: for each W1, choose only (Y1, Y2) = (e1, e1) with all 2 possible co-phasing, i.e.<br>$W_{2,n} \in \left\{ \frac{1}{2}\begin{bmatrix} Y_1 & Y_2 \\ Y_1 & -Y_2 \end{bmatrix}, \frac{1}{2}\begin{bmatrix} Y_1 & Y_2 \\ jY_1 & -jY_2 \end{bmatrix} \right\}$, with<br>(Y1, Y2) = (e1, e2) | 8 × 2 = 16 (4 bits) |

TABLE 4-2

| RI | W1 + W2 index after sub-sampling | No. W1 + W2 hypotheses |
|---|---|---|
| 1 | W1: 0, 2, 4, 6, 8, 10, 12, 14 or 1, 3, 5, 7, 9, 11 13, 15<br>W2: 0~15 | 128 (7 bits) |
| 2 | W1: 0, 4, 8, 12 or 1, 5, 9, 13 or 2, 6, 10, 14 or 3, 7, 11, 15<br>W2: for each W1, choose (Y1, Y2) = (e1, e1) with all 2 possible co-phasing, i.e.<br>$W_{2,n} \in \left\{ \frac{1}{2}\begin{bmatrix} Y_1 & Y_2 \\ Y_1 & -Y_2 \end{bmatrix}, \frac{1}{2}\begin{bmatrix} Y_1 & Y_2 \\ jY_1 & -jY_2 \end{bmatrix} \right\}$, with<br>(Y1, Y2) = (e1, e1);<br>and choose (Y1, Y2) = (e2, e4) with<br>$W_{2,n} = \left\{ \frac{1}{2}\begin{bmatrix} Y_1 & Y_2 \\ Y_1 & Y_2 \end{bmatrix} \right\}$;<br>and chose (Y1, Y2) = (e1, e3) with<br>$W_{2,n} \in \left\{ \frac{1}{2}\begin{bmatrix} Y_1 & Y_2 \\ Y_2 & -Y_1 \end{bmatrix} \right\}$ | 4 × (2 + 1 + 1) = 16 (4 bits) |

Codebook subsample for PUCCH 2-1:

Regarding PUCCH reporting type 1a, i.e. subband CQI/second PMI reporting, the codebook subsampling of table 5 or table 6 or table 7 could be applied.

TABLE 5

| RI | W2 index after sub-sampling | No. W2 hypotheses |
|---|---|---|
| 1 | 0~15 | 16 (4 bits) |
| 2 | W2: for each W1, choose (Y1, Y2) ∈ {(e1, e1), (e2, e2)} with all 2 possible co-phasing, i.e.<br>$W_{2,n} \in \left\{ \frac{1}{2}\begin{bmatrix} Y_1 & Y_2 \\ Y_1 & -Y_2 \end{bmatrix}, \frac{1}{2}\begin{bmatrix} Y_1 & Y_2 \\ jY_1 & -jY_2 \end{bmatrix} \right\}$, with<br>(Y1, Y2) ∈ {(e1, e1), (e3, e3)} | 2 × 2 = 4 (2 bits) |
| 3 | 0, 4, 8, 12 or 1, 5, 9, 13 or 2, 6, 10, 14 or 3, 7, 11, 15 or 0, 1, 2, 3 | 4 (2 bits) |
| 4 | 0, 4, 8, 12 or 1, 5, 9, 13 or 2, 6, 10, 14 or 3, 7, 11, 15 or 0, 1, 2, 3 | 4 (2 bits) |

TABLE 6

| RI | W2 index after sub-sampling | No. W2 hypotheses |
|---|---|---|
| 1 | 0~15 | 16 (4 bits) |
| 2 | W2: for each W1, choose (Y1, Y2) ∈ {(e1, e1), (e2, e2), (e3, e3), (e4, e4)} with only 1 co-phasing, i.e.<br>$W_{2,n} \in \left\{ \frac{1}{2}\begin{bmatrix} Y_1 & Y_2 \\ Y_1 & -Y_2 \end{bmatrix} \right\}$ with<br>(Y1, Y2) ∈ {(e1, e1), (e2, e2), (e3, e3), (e4, e4)} | 4 × 1 = 4 (2 bits) |
| 3 | 0, 4, 8, 12 or 1, 5, 9, 13 or 2, 6, 10, 14 or 3, 7, 11, 15 or 0, 1, 2, 3 | 4 (2 bits) |
| 4 | 0, 4, 8, 12 or 1, 5, 9, 13 or 2, 6, 10, 14 or 3, 7, 11, 15 or 0, 1, 2, 3 | 4 (2 bits) |

TABLE 7

| RI | W2 index after sub-sampling | No. W2 hypotheses |
|---|---|---|
| 1 | 0~15 | 16 (4 bits) |
| 2 | W2: for each W1, choose (Y1, Y2) = (e1, e1) with all 2 possible co-phasing, i.e. $$W_{2,n} \in \left\{ \frac{1}{2}\begin{bmatrix} Y_1 & Y_2 \\ Y_1 & -Y_2 \end{bmatrix}, \frac{1}{2}\begin{bmatrix} Y_1 & Y_2 \\ jY_1 & -jY_2 \end{bmatrix} \right\}, \text{with}$$ (Y1, Y2) = (e1, e1); and choose (Y1, Y2) = (e2, e4) with $$W_{2,n} = \left\{ \frac{1}{2}\begin{bmatrix} Y_1 & Y_2 \\ Y_1 & Y_2 \end{bmatrix} \right\};$$ and chose (Y1, Y2) = (e1, e3) with $$W_{2,n} \in \left\{ \frac{1}{2}\begin{bmatrix} Y_1 & Y_2 \\ Y_2 & -Y_1 \end{bmatrix} \right\}$$ | 2 + 1 + 1 = 4 (2 bits) |
| 3 | 0, 4, 8, 12 or 1, 5, 9, 13 or 2, 6, 10, 14 or 3, 7, 11, 15 or 0, 1, 2, 3 | 4 (2 bits) |
| 4 | 0, 4, 8, 12 or 1, 5, 9, 13 or 2, 6, 10, 14 or 3, 7, 11, 15 or 0, 1, 2, 3 | 4 (2 bits) |

Figure 2:
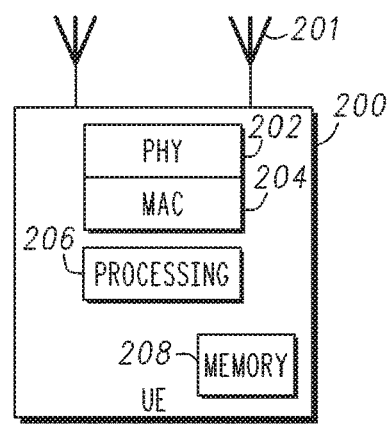
FIG. 2 illustrates a functional block diagram of user equipment (UE) in accordance with some embodiments.

FIG. 2 illustrates a functional block diagram of a UE in accordance with some embodiments. UE 200 may be suitable for use as UE 102 (FIG. 1). The UE 200 may include physical layer circuitry 202 for transmitting and receiving signals to and from eNBs 104 (FIG. 1) using one or more antennas 201. UE 200 may also include medium access control layer (MAC) circuitry 204 for controlling access to the wireless medium. UE 200 may also include processing circuitry 206 and memory 208 arranged to perform the operations described herein.

In some embodiments, the UE 200 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or other device that may receive and/or transmit information wirelessly. In some embodiments, the UE 200 may include one or more of a keyboard, a display, a non-volatile memory port, multiple antennas, a graphics processor, an application processor, speakers, and other mobile device elements. The display may be an LCD screen including a touch screen.

The one or more antennas 201 utilized by the UE 200 may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In some multiple-input multiple-output (MIMO) embodiments, the antennas may be effectively separated to take advantage of spatial diversity and the different channel characteristics that may result between each of antennas and the antennas of a transmitting station. In some MIMO embodiments, the antennas may be separated by up to $1/10$ of a wavelength or more.

Although the UE 200 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage medium, which may be read and executed by at least one processor to perform the operations described herein. A computer-readable storage medium may include any non-transitory mechanism for storing information in a form readable by a machine (e.g., a computer). For example, a computer-readable storage medium may include read-only memory (ROM), random-access memory (RAM), magnetic disk storage media, optical storage media, flash-memory devices, and other storage devices and media. In these embodiments, one or more processors may be configured with the instructions to perform the operations described herein.

In some embodiments, the UE 200 may be configured to receive OFDM communication signals over a multicarrier communication channel in accordance with an OFDMA communication technique. The OFDM signals may comprise a plurality of orthogonal subcarriers. In some broadband multicarrier embodiments, eNBs (including macro eNB 104 and pico eNBs) may be part of a broadband wireless access (BWA) network communication network, such as a Worldwide Interoperability for Microwave Access (WiMAX) communication network or a 3rd Generation Partnership Project (3GPP) Universal Terrestrial Radio Access Network (UTRAN) Long-Term-Evolution (LTE) or a Long-Term-Evolution (LTE) communication network, although the scope of the invention is not limited in this respect. In these broadband multicarrier embodiments, the UE 200 and the eNBs may be configured to communicate in accordance with an orthogonal frequency division multiple access (OFDMA) technique.

In some LTE embodiments, the basic unit of the wireless resource is the Physical Resource Block (PRB). The PRB may comprise 12 sub-carriers in the frequency domain×0.5 ms in the time domain. The PRBs may be allocated in pairs (in the time domain). In these embodiments, the PRB may comprise a plurality of resource elements (REs). A RE may comprise one sub-carrier x one symbol.

Two types of reference signals may be transmitted by an eNB including demodulation reference signals (DM-RS), channel state information reference signals (CIS-RS) and/or a common reference signal (CRS). The DM-RS may be used by the UE for data demodulation. The reference signals may be transmitted in predetermined PRBs.

In some embodiments, the OFDMA technique may be either a frequency domain duplexing (FDD) technique that uses different uplink and downlink spectrum or a time-domain duplexing (TDD) technique that uses the same spectrum for uplink and downlink.

In some other embodiments, the UE 200 and the eNBs may be configured to communicate signals that were transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some LTE embodiments, the UE 200 may calculate several different feedback values which may be used to perform channel adaption for closed-loop spatial multiplexing transmission mode. These feedback values may include a channel-quality indicator (CQI), a rank indicator (RI) and a precoding matrix indicator (PMI). By the CQI, the transmitter selects one of several modulation alphabets and code rate combinations. The RI informs the transmitter about the number of useful transmission layers for the current MIMO channel, and the PMI indicates the codebook index of the precoding matrix (depending on the number of transmit antennas) that is applied at the transmitter. The code rate used by the eNB may be based on the CQI. The PMI may be a vector that is calculated by the UE and reported to the eNB. In some embodiments, the UE may transmit a physical uplink control channel (PUCCH) of format 2, 2a or 2b containing the CQI/PMI or RI.

In these embodiments, the CQI may be an indication of the downlink mobile radio channel quality as experienced by the UE 200. The CQI allows the UE 200 to propose to an eNB an optimum modulation scheme and coding rate to use for a given radio link quality so that the resulting transport block error rate would not exceed a certain value, such as 10%. In some embodiments, the UE may report a wideband CQI value which refers to the channel quality of the system bandwidth. The UE may also report a sub-band CQI value per sub-band of a certain number of resource blocks which may be configured by higher layers. The full set of sub-bands may cover the system bandwidth. In case of spatial multiplexing, a CQI per code word may be reported.

In some embodiments, the PMI may indicate an optimum precoding matrix to be used by the eNB for a given radio condition. The PMI value refers to the codebook table. The network configures the number of resource blocks that are represented by a PMI report. In some embodiments, to cover the system bandwidth, multiple PMI reports may be provided. PMI reports may also be provided for closed loop spatial multiplexing, multi-user MIMO and closed-loop rank 1 precoding MIMO modes.

In some cooperating multipoint (CoMP) embodiments, the network may be configured for joint transmissions to a UE in which two or more cooperating/coordinating points, such as remote-radio heads (RRHs) transmit jointly. In these embodiments, the joint transmissions may be MIMO transmissions and the cooperating points are configured to perform joint beamforming.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a User Equipment (UE) arranged for channel state information (CSI) reporting using a sub-sampled four transmit (4TX) antenna codebook, the apparatus comprising:
   memory; and
   processing circuitry coupled to the memory, to:
   configure the UE for periodic physical uplink control channel (PUCCH) channel-state information (CSI) reporting in accordance with one of a plurality of PUCCH reporting types, the CSI reporting including a rank indicator (RI) and a precoding matrix (W1) that are jointly coded using the subsampled 4TX antenna codebook, the PUCCH reporting types including PUCCH reporting types for four antenna ports,
   the PUCCH reporting types for four antenna ports including:
   a PUCCH reporting type 1a for reporting a subband channel quality indicator (CQI) and a second precoding matrix indicator (PMI),
   a PUCCH reporting type 2c for reporting a CQI, a first PMI and the second PMI, and
   a PUCCH reporting type 5 for reporting the RI and the first PMI; and
   encode a CSI report for transmission on the PUCCH in accordance with the one of the plurality of PUCCH reporting types,
   wherein the PUCCH reporting types indicate a CQI report or a PMI report,
   wherein when the UE is configured for PUCCH reporting type 2c, the processing circuitry is configured to select a single precoding matrix from the subsampled enhanced 4Tx codebook,
   wherein the CQI is calculated based on the selected single precoding matrix, and
   wherein the first PMI and the second PMI correspond to the selected single precoding matrix,
   wherein the memory is configured to store configuration information for the PUCCH reporting types and PUCCH reporting sub-modes, and
   wherein when the UE is configured to support a maximum 2 layer transmission, there is no subsampling and the RI and the W1 are jointly encoded following Table 1,

TABLE 1

| RI | W1 index after sub-sampling | No. W1 hypotheses |
|---|---|---|
| 1 | 0~15 | 16 |
| 2 | 0~15 | 16 |
| Total no. W1 + RI hypotheses across ranks 1-2 (max. layers = 2) | | 32 (5 bits) | and
   wherein when the UE is configured to support a maximum layer 4 transmission, the RI and the W1 are jointly encoded following table 2-1 or table 2-2

TABLE 2-1

| RI | W1 index after sub-sampling | No. W1 hypotheses |
|---|---|---|
| 1 | 0~15 | 16 |
| 2 | 0, 2, 4, 6, 8, 10, 12, 14 | 8 |
| 3 | 0 | 1 |
| 4 | 0 | 1 |
| Total no. W1 + RI hypotheses across ranks 1-4 (max. layers = 4) | | 26 (5 bits) |

TABLE 2-2

| RI | W1 index after sub-sampling | No. W1 hypotheses |
|---|---|---|
| 1 | 0~15 | 16 |
| 2 | 0~7 | 8 |

TABLE 2-2-continued

| RI | W1 index after sub-sampling | No. W1 hypotheses |
|---|---|---|
| 3 | 0 | 1 |
| 4 | 0 | 1 |
| Total no. W1 + RI hypotheses across ranks 1-4 (max. layers = 4). | | 26 (5 bits) |

2. The apparatus of claim 1, wherein the PUCCH reporting types include a PUCCH 1-1 and a PUCCH 2-1, and
wherein for the PUCCH reporting type 5, when the UE is configured to use the PUCCH 1-1, the processing circuitry is configured to jointly code the RI and the first PMI.

3. The apparatus of claim 2, wherein for the PUCCH reporting type 5, when the UE is configured to use the PUCCH 1-1, and the first PMI corresponds to a set of precoding matrices selected from the subsampled 4-Tx codebook.

4. The apparatus of claim 1 wherein the CQI report indicated by the PUCCH reporting types comprises either a wideband CQI or UE selected subband CQI, and
wherein the PMI report indicated by the PUCCH reporting types comprises either no PMI feedback or single PMI feedback.

5. The apparatus of claim 1, wherein the PUCCH reporting type 2c is configured for reporting a wideband CQI, the first PMI and the second PMI.

6. A non-transitory computer-readable storage medium that stores instructions for execution by processing circuitry of a User Equipment (UE), the UE arranged for channel state information (CSI) reporting using a subsampled four transmit (4TX) antenna codebook, the processing circuitry configured to:
configure the UE to perform operations for periodic physical uplink control channel (PUCCH) channel-state information (CSI) reporting in accordance with one of a plurality of PUCCH reporting types for four antenna ports, the CSI reporting including a rank indicator (RI) and a precoding matrix (W1) that are jointly precoded using the subsampled 4TX antenna codebook, the PUCCH reporting types including PUCCH reporting types for four antenna ports,
wherein the PUCCH reporting types for four antenna ports include:
a PUCCH reporting type 1a for reporting a subband channel quality indicator (CQI) and a second precoding matrix indicator (PMI),
a PUCCH reporting type 2c for reporting a CQI, a first PMI and the second PMI, and
a PUCCH reporting type 5 for reporting the RI and the first PMI; and
configure the UE to encode a CSI report for transmission on the PUCCH in accordance with the one of the plurality of PUCCH reporting types,
wherein the PUCCH reporting types indicate a CQI report or a PMI report
wherein when the UE is configured for PUCCH reporting type 2c, the processing circuitry is configured to select a single precoding matrix from the subsampled 4TX codebook,
wherein the CQI is calculated based on the selected single precoding matrix,
wherein the first PMI and the second PMI correspond to the selected single precoding matrix,
wherein the memory is configured to store configuration information for the PUCCH reporting types and PUCCH reporting sub-modes, and
wherein when the UE is configured to support a maximum 2 layer transmission, there is no subsampling and the RI and the W1 are jointly encoded following Table 1,

TABLE 1

| RI | W1 index after sub-sampling | No. W1 hypotheses |
|---|---|---|
| 1 | 0~15 | 16 |
| 2 | 0~15 | 16 |
| Total no. W1 + RI hypotheses across ranks 1-2 (max. layers = 2) | | 32 (5 bits) | and
wherein when the UE is configured to support a maximum layer 4 transmission, the RI and the W1 are jointly encoded following Table 3-1 or Table 3-2

TABLE 3-1

| RI | W1 index after sub-sampling | No. W1 hypotheses |
|---|---|---|
| 1 | 0~15 | 16 |
| 2 | 0~6, 8~14 | 14 |
| 3 | 0 | 1 |
| 4 | 0 | 1 |
| Total no. W1 + RI hypotheses across ranks 1-4 (max. layers = 4) | | 32 (5 bits) |

TABLE 3-2

| RI | W1 index after sub-sampling | No. W1 hypotheses |
|---|---|---|
| 1 | 0~15 | 16 |
| 2 | 0~3 | 14 |
| 3 | 0 | 1 |
| 4 | 0 | 1 |
| Total no. W1 + RI hypotheses across ranks 1-4 (max. layers = 4). | | 32 (5 bits) |

7. The non-transitory computer-readable storage medium of claim 6, wherein the PUCCH reporting types include a PUCCH 1-1 and a PUCCH 2-1, and
wherein for the PUCCH reporting type 5, when the UE is configured to use the PUCCH 1-1, the instructions configure the UE to jointly code the RI and the first PMI.

8. The non-transitory computer-readable storage medium of claim 7, wherein for the PUCCH reporting type 5, when the UE is configured to use the PUCCH 1-1, and the first PMI indicates at least one precoding matrix that is selected from the subsampled 4Tx codebook.

9. The non-transitory computer-readable storage medium of claim 6 wherein the CQI report indicated by the PUCCH reporting types comprises either a wideband CQI or UE selected subband CQI, and
wherein the PMI report indicated by the PUCCH reporting types comprises either no PMI or a single PMI.

10. The non-transitory computer-readable storage medium of claim 6, wherein the PUCCH reporting type 2c is configured for reporting a wideband CQI, the first PMI and the second PMI.

11. A method for reporting channel state information (CSI) using a subsampled four transmit 4Tx antenna codebook, performed by a User Equipment (UE), the method comprising:

configuring the UE to perform operations for periodic physical uplink control channel (PUCCH) channel-state information (CSI) reporting in accordance with one of a plurality of PUCCH reporting types, the CSI reporting including a rank indicator (RI) and a precoding matrix (W1) that are jointly precoded using the subsampled 4TX antenna codebook, the PUCCH reporting types including PUCCH reporting types for four antenna ports, wherein the PUCCH reporting types for four antenna ports include:

a PUCCH reporting type 1a for reporting a subband channel quality indicator (CQI) and a second precoding matrix indicator (PMI), a PUCCH reporting type 2c for reporting a CQI, a first PMI and the second PMI, and a PUCCH reporting type 5 for reporting the RI and the first PMI; and encoding a CSI report for transmission on the PUCCH in accordance with the one of the plurality of PUCCH reporting types, wherein the PUCCH reporting types indicate one of a CQI report and a PMI report, wherein UE is configured to store configuration information for the PUCCH reporting types and PUCCH sub-modes wherein when the UE is configured for PUCCH reporting type 2c, the method further comprises configuring the UE to select a single precoding matrix from the subsampled 4TX codebook, wherein the CQI is calculated based on the selected single precoding matrix, wherein the first PMI and the second PMI correspond to the selected single precoding matrix, and for ranks 1 and 2, Table 4-1 or Table 4-2 is used for codebook subsampling

TABLE 4-1

| RI | W1 + W2 index after sub-sampling | No. W1 + W2 hypotheses |
|---|---|---|
| 1 | W1: 0, 2, 4, 6, 8, 10, 12, 14 or 1, 3, 5, 7, 9, 11, 13,15<br>W2: 0~15 | 128 (7 bits) |

TABLE 4-1-continued

| RI | W1 + W2 index after sub-sampling | No. W1 + W2 hypotheses |
|---|---|---|
| 2 | W1: 0, 2, 4, 6, 8, 10, 12, 14 or 1, 3, 5, 7, 9, 11, 13, 15<br>W2: for each W1, choose only (Y1, Y2) = (e1, e1) with all 2 possible co-phasing, i.e.<br>$W_{2,n} \in \left\{ \frac{1}{2}\begin{bmatrix} Y_1 & Y_2 \\ Y_1 & -Y_2 \end{bmatrix}, \frac{1}{2}\begin{bmatrix} Y_1 & Y_2 \\ jY_1 & -jY_2 \end{bmatrix} \right\}$, with<br>(Y1, Y2) = (e1, e2) | 8 × 2 = 16 (4 bits) |

TABLE 4-2

| RI | W1 + W2 index after sub-sampling | No. W1 + W2 hypotheses |
|---|---|---|
| 1 | W1: 0, 2, 4, 6, 8, 10, 12, 14 or 1, 3, 5, 7, 9, 11, 13, 15<br>W2: 0~15 | 128 (7 bits) |
| 2 | W1: 0, 4, 8, 12 or 1, 5, 9, 13 or 2, 6, 10, 14 or 3, 7, 11, 15<br>W2: for each W1, choose (Y1, Y2) = (e1, e1)<br>with all 2 possible co-phasing, [[i.e.]]<br>$W_{2,n} \in \left\{ \frac{1}{2}\begin{bmatrix} Y_1 & Y_2 \\ Y_1 & -Y_2 \end{bmatrix},\right.$<br>$\left.\frac{1}{2}\begin{bmatrix} Y_1 & Y_2 \\ jY_1 & -jY_2 \end{bmatrix} \right\}$, with<br>(Y1, Y2) = (e1, e1);<br>and choose (Y1, Y2) = (e2, e4)<br>with $W_{2,n} = \left\{ \frac{1}{2}\begin{bmatrix} Y_1 & Y_2 \\ Y_1 & Y_2 \end{bmatrix} \right\}$;<br>and choose (Y1, Y2) = (e1, e3)<br>with $W_{2,n} \in \left\{ \frac{1}{2}\begin{bmatrix} Y_1 & Y_2 \\ Y_2 & -Y_1 \end{bmatrix} \right\}$. | 4 × (2 + 1 + 1) = 16 (4 bits) |

12. The method of claim 11, wherein the reporting includes a PUCCH 1-1 and a PUCCH 2-1, and wherein for the PUCCH reporting type 5, when the UE is configured to use the PUCCH 1-1, the method further comprises configuring the UE to jointly encode the RI and the W1 using the subsampled 4Tx antenna codebook.

13. The method of claim 12, wherein for the PUCCH reporting type 5, when the UE is configured to use the PUCCH 1-1, the first PMI indicates at least one precoding matrix selected from the subsampled 4Tx codebook.

14. The method of claim 11, wherein the CQI report indicated by the PUCCH reporting types comprises either a wideband CQI or UE selected subband CQI, and wherein the PMI report indicated by the PUCCH reporting types comprises either no PMI or a single PMI.

15. The method of claim 11, wherein the PUCCH reporting type 2c is configured for reporting a wideband CQI, the first PMI and the second PMI.

* * * * *

UNITED STATES PATENT AND TRADEMARK OFFICE
CERTIFICATE OF CORRECTION

PATENT NO. : 10,312,981 B2
APPLICATION NO. : 15/413182
DATED : June 4, 2019
INVENTOR(S) : Chen et al.

Page 1 of 1

It is certified that error appears in the above-identified patent and that said Letters Patent is hereby corrected as shown below:

On the Title Page

On page 2, in Column 2, under "Other Publications", Line 38, delete "Feb. 3, 2015" and insert --Feb. 3, 2016-- therefor On page 3, in Column 2, under "Other Publications", Line 36, delete ""Uropean" and insert --"European-- therefor In the Claims In Column 11, Line 61, in Claim 6, after "report", insert --,--

In Column 13, Line 43, in Claim 11, after "sub-modes", insert --,--

In Column 13, Line 54, in Claim 11, after "subsampling", insert --,--

Signed and Sealed this
Twenty-first Day of April, 2020

Andrei Iancu
*Director of the United States Patent and Trademark Office*